United States Patent Office 3,506,639
Patented Apr. 14, 1970

3,506,639
PROCESS FOR INCREASING MOLECULAR
WEIGHT OF LIVE POLYMERS
Adel F. Halasa, Akron, Ohio, assignor to The Firestone Tire & Rubber Company, Akron, Ohio, a corporation of Ohio
No Drawing. Filed Feb. 1, 1968, Ser. No. 702,188
Int. Cl. C08d 5/04; C08f 27/03, 1/88
U.S. Cl. 260—94.7        10 Claims

ABSTRACT OF THE DISCLOSURE

The molecular weight of polymers derived at least in part from conjugated diene monomers containing 4 to 12 carbon atoms is increased by reacting the cement of live polymer with a multi-halogenated aromatic compound of the class consisting of mononuclear and polynuclear hydrocarbons and hydrogen derivatives thereof. Dichlorobenzenes are preferred, and especially 1,2-dichlorobenzene, and the reaction is preferably carried out in the presence of an alkali metal hydrocarbon initiator. Live molecules of the polymer contain at least one and may contain two or more alkali metal terminal groups which may be lithium, sodium, potassium, rubidium or cesium. The reaction is usually carried out in an inert hydrocarbon solvent, for example hexane, heptane or benzene.

The reaction vessel is charged with one or more diene monomers including, for example, butadiene, isoprene, piperylene, 2,3-dimethylbutadiene, chloroprene, etc. The monomer is polymerized in a solvent using an alkali metal initiator. The increase in the molecular weight of the resulting live polymer is effected by reaction with multi-halogen compound, with or without the addition of an alkali metal initiator. As compared with the starting polymers, the reacted polymers of this invention have better processability and reduced cold flow with higher Williams recovery, and broad molecular weight distribution.

---

The molecular weight of a polymer derived at least in substantial part from a conjugated diene monomer containing 4 to 12 carbon atoms per molecule, which is a live polymer which contains at least one and may contain two or more alkali metal terminal groups, is increased by reaction with a nuclearly multi-halogenated aromatic compound which is free of activating groups and is of the class consisting of mononuclear and polynuclear hydrocarbons and hydrocarbon derivatives thereof, especially 1,2-dichlorobenzene. A mixture of multi-halogenated aromatic compounds may be used as the joining agent. In the preferred procedure the reaction is effected in the presence of lithium- or other alkali metal hydrocarbon polymerization initiator. The invention includes both the process and the product.

The live polymer may be a copolymer, and the molecular weight of one or more polymers may be increased by reaction with one or more halogenated compounds. Thus, the final polymers may be represented by the formula $A_xB_y$ in which the one or more A's are from a vinylidene monomer and the any one or more B's that may be present are from an aromatic compound of the class consisting of mononuclear and polynuclear hydrocarbons and hydrocarbon derivatives thereof. The subscript $x$, which represents 2 or a larger number, indicates the number of chains of the starting polymer in the final polymer, and $y$ which is 0 or greater represents the number of aromatic nuclei from the halogenated joining reagent, which may or may not enter into the polymer product. There is no necessary upper limit to either $x$ or $y$, their sizes being dependent upon the molecular weight of the final polymer.

The aromatic halogen compounds used as joining agents are recognized as being generally very stable and unreactive and it is surprising that they react as joining agents.

The rubbery polymers of higher molecular weight produced by this process are useful for the purposes for which the starting polymers have been employed, as in the production of coatings, adhesives, films, foams and vulcanized rubbery products. They have improved processability, broader molecular weight distribution, are freer from cold flow, and have a relatively high Williams recovery.

The live polymers which contain at least one terminal group of an alkali metal, viz. lithium, sodium, potassium, rubidium or cesium are obtainable by the known method in which the monomer or mixture of monomers is polymerized using an alkali metal or alkali metal hydrocarbon as initiator.

The starting polymers, derived in substantial part from conjugated diene monomers, include butadiene polymers and copolymers (e.g., BR; SBR; ABR and NBR copolymers), isoprene polymers and copolymers (e.g., IR; ISR; AIR; NIR; BIR and BISR copolymers) and chloroprene polymers and copolymers (e.g., CR and CIR; CBR). The so-called stereo rubbers have been of great interest in recent years, but the properties of most of these new synthetic rubbers have not been completely satisfactory for all uses, as witness the widespread practice of blending such rubbers with natural rubber or emulsion SBR.

The starting rubbers are produced by polymerization of a diene by means of an alkalimetalhydrocarbon catalyst or a coordination catalyst. Preferred linear, rubbery polymers of diene monomers are prepared by polymerization of a conjugated diolefin by means of a hydocarbon lithium catalyst in the absence of the usual ether-type activator, air and moisture; copolymers of butadiene and isoprene or of either or both such diolefin with styrene or methylstyrene are produced by the same technique. Such polymers and methods of making same are disclosed in British patent specifications 814,676; 826,918; 813,198; 817,693; 817,695; 972,258; and 994,726; the disclosures of which are incorporated herein by reference. Such rubbery linear polymers are characterized by high 1,4-content, high linearity and narrow molecular weight distribution. The vulcanizates of such polymers are characterized by excellent physical properties, including high resiliency, low hysteresis, excellent resistance to abrasion, low running temperatures and excellent flexibility and retention of other good physical properties at extremely low temperatures typical of the Arctic in winter, all in comparison with standard emulsion polymerizates, such as commercial SBR. However, such lithium polymers are more difficult to process in standard rubber equipment, such as Banbury mixers, mills and tubers, as compared to natural rubber and SBR, so that they are usually mixed with natural rubber and/or SBR for commercial use. Certain of such polymers produced by lithium catalysts also possess undesirable cold-flow properties.

The conjugated diene monomers which may be used are those containing from 4 to 12 carbon atoms per molecule and preferably 4 to 8 carbon atoms per molecule. Examples of these compounds include the following: 1,3-butadiene, isoprene, 2,3-dimethyl-1,3-butadiene, 1,3-pentadiene (piperylene), 2-methyl-3-ethyl-1,3-butadiene, 3-methyl-1,3-pentadiene, 2-methyl-3-ethyl-1,3-pentadiene, 2-ethyl-1,3-pentadiene, 1,3-hexadiene, 2-methyl-1,3-hexadiene, 1,3-heptadiene, 3-methyl-1,3-heptadiene, 1,3-octadiene, 3-butyl-1,3-octadiene, 3,4-dimethyl-1,3-hexadiene, 3 - n - propyl-1,3-pentadiene, 4.5-diethyl-1,3-octadiene, phenyl - 1,3-butadiene, 2,3-diethyl-1,3-butadiene, 2,3-di-n - propyl-1,3-butadiene, 2-methyl-3-isopropyl-1,3-butadiene and the like. Conjugated dienes containing halogen and alkoxy substituents along the chain can also be employed, such as chloroprene, fluoroprene, 2-methoxy-1,3-butadiene, 2-methoxy-3-methyl-1,3-butadiene, 2-ethoxy-3-ethyl-1,3-butadiene, and 2-ethoxy-3-methyl-1,3-hexadiene. Conjugated dienes can be polymerized alone or in admixture with each other to form copolymers, or block copolymers. Block copolymers can be prepared from two or more conjugated dienes by charging one compound initially, allowing it to polymerize, and then adding a second conjugated diene and allowing it to polymerize. The preferred monomers are butadiene, isoprene and piperylene.

The reaction of the invention is conveniently carried out in an inert solvent, usually a hydrocarbon solvent and preferably hexane, heptane or benzene, and it may be a mixture of solvents. The joining reaction is advantageously carried out in the solution in which the live polymer is formed. The reaction is usually carried out at a temperature between 30° C. and 150° C., usually at the pressure of the solvent at these temperatures. Pressures above and below atmospheric may be used.

The joining agent is preferably a dichlorobenzene or derivative thereof, including, for example:

1,2-dichlorobenzene
1,3-dichlorobenzene
1,4-dichlorobenzene
2,3-dichlorotoluene
3,4-dichlorotoluene
2,5-dichlorotoluene
3,5-dichlorotoluene
2,4-dichlorotoluene
2,6-dichlorotoluene
2,4-dichloro-m-xylene
2,5-dichloro-m-xylene
4,5-dichloro-m-xylene
4,6-dichloro-m-xylene
3,4-dichloro-o-xylene
3,5-dichloro-o-xylene
3,6-dichloro-o-xylene
4,5-dichloro-o-xylene
2,3-dichloro-p-xylene
2,5-dichloro-p-xylene
2,6-dichloro-p-xylene
2,3-dichloro-1-ethylbenzene Other joining agents include, for example:

1,2-dichloronaphthalene
1,3-dichloronaphthalene
1,8-dichloronaphthalene
2,3-dichloronaphthalene
1,4-dichloronaphthalene
1,5-dichloronaphthalene
1,6-dichloronaphthalene
1,7-dichloronaphthalene
2,6-dichloronaphthalene
2,7-dichloronaphthalene
1,2-dichloroanthracene
1,3-dichloroanthracene
1,4-dichloroanthracene and the hydrocarbon derivatives thereof as well as compounds containing more than two chlorine groups including, for example:

1,3,5-trichlorobenzene
1,2,3-trichlorobenzene
1,2,4-trichlorobenzene and the multi-chlorinated naphthalenes and anthracenes, the number of halogens being limited to the number of replaceable nuclear hydrogens.

The bromo-, iodo-, chlorobromo-, chloriodo- and bromoiodo-, etc. benzene derivatives corresponding to the foregoing may be used, as well as other multi-halogenated polynuclear compounds, including the halogenated fluorenes, indenes, phenanthrenes, etc.

The polymerization initiator used in the joining reaction is advantageously the same as that used in the polymerization, and may be any alkali metal hydrocarbon initiator including the lithium-, sodium-, potassium-, rubidium-, and cesium-based initiators derived from the same hydrocarbon compounds as the known hydrocarbon lithium initiators, including methyl lithium, ethyl lithium, butyl lithium, amyl lithium, hexyl lithium, 2-ethylhexyl lithium, n-hexadecyl lithium, allyl lithium, methallyl lithium, phenyl lithium, tolyl lithiums, xylyl lithiums, methylene dilithium, ethylene dilithium, trimethylene dilithium, pentamethylene dilithium decamethylene dilithium, octadecamethylene dilithium, 1,2-dilithium propane, 1,4-dilithium benzene, 1,5-dilithium naphthalene, 1,2-dilithium-1,3-diphenyl propane, 1,35-trilithium pentane, 1,3,5-trilithium benzene and any hydrocarbon containing from 1 to about 40 carbon atoms in which lithium has replaced a plurality of hydrogen atoms.

The following examples are illustrative.

EXAMPLE 1

Polybutadiene was prepared in a usual manner by polymerizing 25 percent by weight of butadiene-1,3 in 75 percent by weight of hexane at 50° C. for 6 hours, using n-butyllithium (BuLi) as initiator. After polymerization was completed, the cement containing 100 grams of the live polymer was treated with additional n-butyllithium for 3 hours at 70° C. to raise the content to the level necessary to obtain maximum molecular weight increase, the amount of n-butyllithium used being increased as an increased amount of 1,2-dichlorobenzene ($C_6H_4Cl_2$) was used, as illustrated in the following table.

TABLE I

| Run | BuLi, Mmoles | $C_6H_4Cl_2$, Mmoles | DSV [1] | Williams recovery |
|---|---|---|---|---|
| Control | None | None | 0.91 | 0.03 |
| 1 (Live Cement) | None | 3.08 | 1.81 | 0.14 |
| 2 | 3.08 | 3.0 | 2.19 | 3.49 |
| 3 | 6.16 | 6.0 | 3.09 | 5.09 |
| 4 | 9.24 | 9.0 | 3.90 | 5.59 |
| 5 | 12.32 | 12.0 | 0.69 | 5.43 |

[1] Dilute Solution Viscosity. ASTM: D1601-61 Part 27, June 1967, page 531.

No gel was found in the polymer obtained from any of the runs. This example illustrates the joining reaction both with and without initiator.

EXAMPLE 2

Live polymer (100 grams) of isoprene polymerized with n-butyllithium (BuLi) was treated with additional BuLi in amounts given in the following table. Polyisoprene obtained in this way was reacted for 3 hours at 70° C. with 1,2-dichlorobenzene in the different amounts given in the table, and the molecular weight was thereby increased, as evidenced by the increase in viscosity as given in the table.

TABLE II

| Run | BuLi, Mmoles | $C_6H_4Cl_2$, Mmoles | DSV | Gel |
|---|---|---|---|---|
| Control | 3.0 | None | 1.99 | None |
| 6 | 3.0 | 0.6 | 2.57 | None |
| Control | 4.20 | None | 3.33 | 6.60 |
| 7 | 4.20 | 2.0 | 4.51 | 5.3 |
| 8 | 4.20 | 3.0 | 4.58 | 7.20 |
| Control | 4.50 | None | 3.40 | 0.0 |
| 9 | 4.50 | 42 | 4.20 | 100% |
| Control | 0.08 | None | 3.34 | 0.0 |
| 10 | 0.08 | 0.80 | 4.69 | 0.0 |
| 11 | 0.08 | 1.20 | 5.50 | 0.0 |

Gel was found in only those polymers produced in the presence of large amounts of dichlorobenzene.

I claim:

1. The process of increasing the molecular weight of live polymers of conjugated diene monomers containing 4 to 12 carbon atoms per monomer molecule and copolymers thereof and each comprising at least one alkali metal terminal group, there being substantially none of said monomer present, which process comprises bringing said live polymer or copolymer into reactive relation with a nuclearly multi-halogenated mononuclear or polynuclear aromatic hydrocarbon or a methyl or ethyl derivative thereof which is free of activating groups at a temperature of 30° to 150° C., whereby to effect a joining reaction.

2. The process of claim 1 in which the joining reaction is carried out in solution.

3. The process of claim 2 in which the joining reaction is carried out in the presence of an alkali metal hydrocarbon polymerization initiator.

4. The process of claim 2 in which the live polymer includes molecules having two alkali metal terminal groups.

5. The process of claim 2 in which the live polymer is a polymer of a conjugated diene of 4 to 12 carbon atoms per monomer molecule.

6. The process of claim 2 in which the halogenated compound is 1,2-dichlorobenzene.

7. The process of claim 2 in which the live polymer is polybutadiene, the halogenated compound is a dichlorobenzene, and a hydrocarbon lithium polymerization initiator is present.

8. The process of claim 7 in which the initiator is n-butyllithium.

9. The process of claim 2 in which the polymer is polyisoprene, the halogenated compound is a dichlorobenzene, and a hydrocarbon lithium polymerization initiator is present.

10. The process of claim 9 in which the initiator is n-butyllithium.

References Cited
UNITED STATES PATENTS

| | | | |
|---|---|---|---|
| 3,078,254 | 2/1963 | Zelinski et al. | 260—45.5 |
| 3,318,862 | 5/1967 | Hinton | 260—94.2 |

JOSEPH L. SCHOFER, Primary Examiner

W. F. HAMROCK, Assistant Examiner

U.S. Cl. X.R.

260—82.1, 85.1, 91.1, 92.1, 92.3, 94.2

PO-1050
(5/69)

UNITED STATES PATENT OFFICE
CERTIFICATE OF CORRECTION

Patent No. 3,506,639              Dated  April 14, 1970

Inventor(s)      Adel F. Halasa

It is certified that error appears in the above-identified patent and that said Letters Patent are hereby corrected as shown below:

Col. 4, line 17, "1,35-trilithium pentane" should read --1,3,5-trilithium pentane--

SIGNED AND SEALED
SEP 15 1970

(SEAL)
Attest:

Edward M. Fletcher, Jr.
Attesting Officer

WILLIAM E. SCHUYLER, JR.
Commissioner of Patents